(12) United States Patent
Gordon et al.

(10) Patent No.: US 7,992,172 B1
(45) Date of Patent: Aug. 2, 2011

(54) METHOD AND SYSTEMS FOR MULTICAST USING MULTIPLE TRANSPORT STREAMS

(75) Inventors: Donald F. Gordon, Los Altos, CA (US); Brian Feinberg, Cupertino, CA (US); Eugene Gershtein, Redwood City, CA (US); Sadik Bayrakeri, Foster City, CA (US); John P. Comito, Redwood City, CA (US); Edward A. Ludvig, Redwood City, CA (US)

(73) Assignee: Cox Communications, Inc., Atlanta, GA (US)

( * ) Notice: Subject to any disclaimer, the term of this patent is extended or adjusted under 35 U.S.C. 154(b) by 1411 days.

(21) Appl. No.: 09/679,210

(22) Filed: Oct. 4, 2000

Related U.S. Application Data (63) Continuation-in-part of application No. 09/466,990, filed on Dec. 10, 1999, now Pat. No. 6,614,843, which is a continuation-in-part of application No. 09/293,535, filed on Apr. 15, 1999, now Pat. No. 6,584,153, which is a continuation-in-part of application No. 09/384,394, filed on Aug. 27, 1999, now Pat. No. 6,621,870, which is a continuation-in-part of application No. 09/428,066, filed on Oct. 27, 1999, now Pat. No. 6,651,252, and a continuation-in-part of application No. 09/539,228, filed on Mar. 30, 2000, now abandoned, which is a continuation-in-part of application No. 09/524,854, filed on Mar. 14, 2000, now Pat. No. 7,127,737.

(60) Provisional application No. 60/220,910, filed on Jul. 26, 2000.

(51) Int. Cl.
*H04N 7/16* (2006.01)

(52) U.S. Cl. ............... 725/54; 725/46; 725/48; 348/569

(58) Field of Classification Search ............. 725/82, 725/91–94, 114–116, 138, 37–61, 144–146; 348/10, 13, 460, 549, 569, 906
See application file for complete search history.

(56) References Cited

U.S. PATENT DOCUMENTS

| | | | | |
|---|---|---|---|---|
| 5,515,106 A | * | 5/1996 | Chaney et al. | 725/48 |
| 5,675,384 A | * | 10/1997 | Ramamurthy et al. | 375/240.04 |
| 5,841,433 A | * | 11/1998 | Chaney | 725/50 |
| 5,867,208 A | * | 2/1999 | McLaren | 725/139 |

(Continued)

*Primary Examiner* — Annan Q Shang
(74) *Attorney, Agent, or Firm* — Merchant & Gould (57) ABSTRACT

A system for delivering interactive program guide (IPG) includes a number of encoding units, at least one transport stream generator, and a session manager. The encoding units encode a number of IPG pages and generate a number of (e.g., guide, video, audio, and data) streams, with each stream being assigned a respective packet identifier (PID). Each transport stream generator receives and multiplexes selected ones of the streams from one or more encoding units into one or more transport streams. The session manager directs each transport stream generator to generate one or more transport streams based on usage. The system may further include a bandwidth manager that monitors usage and reports the usage to the session manager. The encoding units can be operated to encode only once each IPG page to be transmitted. Each transport stream generator can be operated to provide differentiated IPG for the neighborhood being served by the transport stream generator. The number of transport streams generated by each transport stream generator can be dynamically adjusted based on demands from the neighborhood being served by the transport stream generator. Each transport stream generator can be directed to generate an additional transport stream if usage exceeds the capacity of the currently transmitted transport streams.

20 Claims, 4 Drawing Sheets

U.S. PATENT DOCUMENTS

| | | | | |
|---|---|---|---|---|
| 5,990,883 A | * | 11/1999 | Byrne et al. | 715/721 |
| 6,134,532 A | * | 10/2000 | Lazarus et al. | 705/14 |
| 6,219,358 B1 | * | 4/2001 | Pinder et al. | 370/537 |
| 6,292,834 B1 | * | 9/2001 | Ravi et al. | 709/233 |
| 6,389,593 B1 | * | 5/2002 | Yamagishi | 725/9 |
| 6,401,242 B1 | * | 6/2002 | Eyer et al. | 725/35 |
| 6,421,359 B1 | * | 7/2002 | Bennett et al. | 370/538 |
| 6,459,427 B1 | * | 10/2002 | Mao et al. | 725/109 |
| 6,463,585 B1 | * | 10/2002 | Hendricks et al. | 725/35 |
| 6,469,861 B2 | * | 10/2002 | Onuki et al. | 360/77.02 |
| 6,487,121 B1 | * | 11/2002 | Thurgate et al. | 365/185.18 |
| 6,606,746 B1 | * | 8/2003 | Zdepski et al. | 725/37 |
| 6,622,171 B2 | * | 9/2003 | Gupta et al. | 709/231 |
| 6,751,259 B2 | * | 6/2004 | Zhang et al. | 375/240.26 |
| 6,831,892 B2 | * | 12/2004 | Robinett et al. | 370/232 |
| 6,909,726 B1 | * | 6/2005 | Sheeran | 370/468 |
| 6,938,268 B1 | * | 8/2005 | Hodge | 725/93 |
| 7,278,152 B1 | * | 10/2007 | Rao | 725/91 |
| 7,519,982 B1 | * | 4/2009 | Gordon et al. | 725/54 |
| 7,607,152 B1 | * | 10/2009 | Gordon et al. | 725/54 |
| 7,620,073 B2 | * | 11/2009 | Robinett et al. | 370/486 |

* cited by examiner

METHOD AND SYSTEMS FOR MULTICAST USING MULTIPLE TRANSPORT STREAMS

CROSS-REFERENCES TO RELATED APPLICATIONS

This application claims the benefit of U.S. Provisional Application Ser. No. 60/220,910, entitled "SYSTEM AND METHOD FOR MULTICAST USING MULSTIPLE TRANSPORT STREAMS," filed Jul. 26, 2000. This application is further a continuation-in-part of U.S. patent application Ser. No. 09/466,990, entitled "STREAM INDEXING FOR DELIVERY OF INTERACTIVE PROGRAM GUIDE," filed Dec. 10, 1999 now U.S. Pat. No. 6,614,843, which is a continuation-in-part of Ser. No. 09/293,535, entitled "IMPROVED DATA STRUCTURE AND METHODS FOR PROVIDING AN INTERACTIVE PROGRAM GUIDE", filed Apr. 15, 1999 now U.S. Pat. No. 6,584,153, Ser. No. 09/384,394, entitled "METHOD AND APPARATUS FOR COMPRESSING VIDEO SEQUENCES," filed Aug. 27, 1999 now U.S. Pat. No. 6,621,870, and Ser. No. 09/428,066 filed Oct. 27, 1999 now U.S. Pat. No. 6,651,252, entitled "METHOD AND APPARATUS FOR TRANSMITTING VIDEO AND GRAPHICS IN A COMPRESSED FORM."

This application is further a continuation-in-part of U.S. patent application Ser. No. 09/539,228, (now abandonded), entitled "MESSAGING PROTOCOL FOR DEMAND-CAST SYSTEM AND BANDWIDTH MANAGEMENT," filed Mar. 30, 2000 now abandoned, which is a continuation-in-part of U.S. patent application Ser. No. 09/524,854, (now U.S. Pat. No. 7,127,737), entitled "BANDWIDTH MANAGEMENT TECHNIQUES FOR DELIVERY OF INTERACTIVE PROGRAM GUIDE," filed Mar. 14, 2000 now U.S. Pat. No. 7,127,737.

The above-identified related applications are all assigned to the assignee of the present invention and incorporated herein by reference in their entirety for all purposes. Application Ser. No. 09/466,990 is attached hereby as Exhibit A and Ser. No. 09/539,228 is attached hereby as Exhibit B.

BACKGROUND OF THE INVENTION

The present invention relates to communications systems in general. More specifically, the invention relates to techniques to efficiently deliver interactive program guide (IPG) in a server-centric system.

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top terminals, or other methods of trying to offer service differentiated from standard cable and over the air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, and the ability to look forward to plan television viewing as much as several weeks in advance.

With this increase in the quantity of programming, it is a challenge to deliver program guide data to viewers in an efficient and effective manner. A large amount of resources (e.g., bandwidth) would normally be needed to continually transmit, for example, two weeks of programming for 200 channels. Therefore, efficient and effective techniques to deliver interactive program guide to a large number of viewers are highly desirable.

SUMMARY OF THE INVENTION

The invention provides various techniques to effectively and efficiently deliver interactive program guide. In accordance with the "multicasting" techniques of the invention, a varying number of transport streams can be generated and used to serve a distribution node having time varying demands. Multiple transport streams can provide additional transmission capacity (i.e., more bandwidth) and can also accommodate a larger number of packet identifiers (PIDs), which is especially useful for a demand-cast system during periods of heavy demands. The particular number of transport streams to be provided to the distribution node can be based on the actual needs of the node and, in accordance with an aspect of the invention, can be dynamically adjusted. Thus, additional transport streams can be sent to the distribution node as demands increase, with more transport streams being provided during periods of heavy demands. Correspondingly, transport streams can be tear down when the demands subside.

An embodiment of the invention provides a system for delivering interactive program guide (IPG). The system includes a number of encoding units, at least one transport stream generator, and a session manager. The encoding units encode a number of IPG pages and generate a number of (e.g., guide, video, audio, and data) streams, with each stream being assigned a respective packet identifier (PID). Each transport stream generator receives and multiplexes selected ones of the streams from one or more encoding units into one or more transport streams. The session manager directs each transport stream generator to generate one or more transport streams based on usage. The system may further include a bandwidth manager that monitors usage and reports the usage to the session manager.

The encoding units can be operated to encode only once each IPG page to be transmitted from the system. Also, each encoding unit can perform slice-based or picture-based encoding of the IPG. Each transport stream generator can be operated to provide differentiated IPG for the neighborhood being served by the transport stream generator.

The number of transport streams generated by each transport stream generator can be dynamically adjusted based on demands from the neighborhood being served by the transport stream generator. Each transport stream generator can be directed to generate an additional transport stream if usage exceeds the capacity of the currently transmitted transport streams. For example, additional transport stream can be generated if the number of (e.g., guide, video, audio, and data) streams to be transmitted or if the required number of PIDs exceeds the capacity provided by the currently transmitted transport streams. Correspondingly, a particular transport stream can be tear down if usage falls below the capacity of remaining transport streams.

Various multiplexing structures can also be used, as described below. When multiple transport streams are employed, the IPG pages for the transport streams can be organized to reduce the likelihood of switching between transport streams at a receiving device, and to increase the likelihood of PID transitions within the same transport stream.

The invention further provides other systems and methods that implement, process, and/or facilitate the IPG delivery techniques described herein. Also, the techniques described herein can be used to deliver other types of contents besides IPG.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

To facilitate understanding, identical reference numerals have been used, where possible, to designate identical elements that are common within a figure.

DESCRIPTION OF THE SPECIFIC EMBODIMENTS

As shown in FIG. 1 of the attached Exhibit B, the head-end may service a number of distribution nodes directly or via local neighborhood equipment. Each distribution node may include a number of terminals (e.g., 4000 or more terminals). The programming (e.g., the IPG) provided to each distribution node may be different from that of other nodes. This differentiated programming can be achieved by transmitting one or more (distinct) transport streams to each distribution node.

As shown in FIG. 8 of Exhibit B, a number of IPG pages can be continually broadcast to each distribution node (e.g., 40 pages in the example shown in FIG. 8 of Exhibit B). Other IPG pages can be sent to viewers within the distribution node as requested via demand-cast. The IPG pages can be coded using picture-based and/or slice-based encoding schemes in the manner described in the attached Exhibit A and the coded pages can be assigned PIDs. Depending on the particular encoding scheme used, a set of 10 IPG pages may utilized 12 PIDs for the video and guide portions, another PID for the audio, and one or more PIDs for the data (as shown in FIG. 10C of Exhibit A). For demand-cast, each requested IPG page may be assigned with one or more PIDs for the demand-casted page.

To service a large number of terminals in a particular distribution node, especially during periods of heavy activity (e.g., during prime time periods) a large number of PIDs may be required. In accordance with the MPEG-2 standard, only a particular number of PIDs can be supported by each transport stream, as shown in FIG. 29 of Exhibit A. Also, depending on the demands, a large transmission capacity may be required to send the required contents (e.g., the requested IPG pages). In a system in which resources (i.e., bandwidth) is limited, viewer requests for IPG pages may not be serviced if the required bandwidth is not available, which then results in blockage as described in Exhibit B. Blockage degrades the quality of service and is highly undesirable in many circumstances.

An aspect of the invention provides "multicasting" techniques that can be used to serve the time varying demands of a distribution node. Via multicasting, a number of transport streams can be generated and used to service a distribution node having, or during periods of, heavy demands. The multiple transport streams can provide additional transmission capacity (i.e., more bandwidth) and can also accommodate a larger number of PIDs. The larger number of PIDs is especially useful for demand-cast, during periods of heavy demands. The particular number of transport streams to be provided to the distribution node can be based on the actual needs of the node and, in accordance with an aspect of the invention, can be dynamically adjusted. Thus, additional transport streams can be sent to the distribution node as demands increase, with more transport streams being provided during periods of heavy demands. Correspondingly, transport streams can be tear down when the demands subside.

Figure 1A:
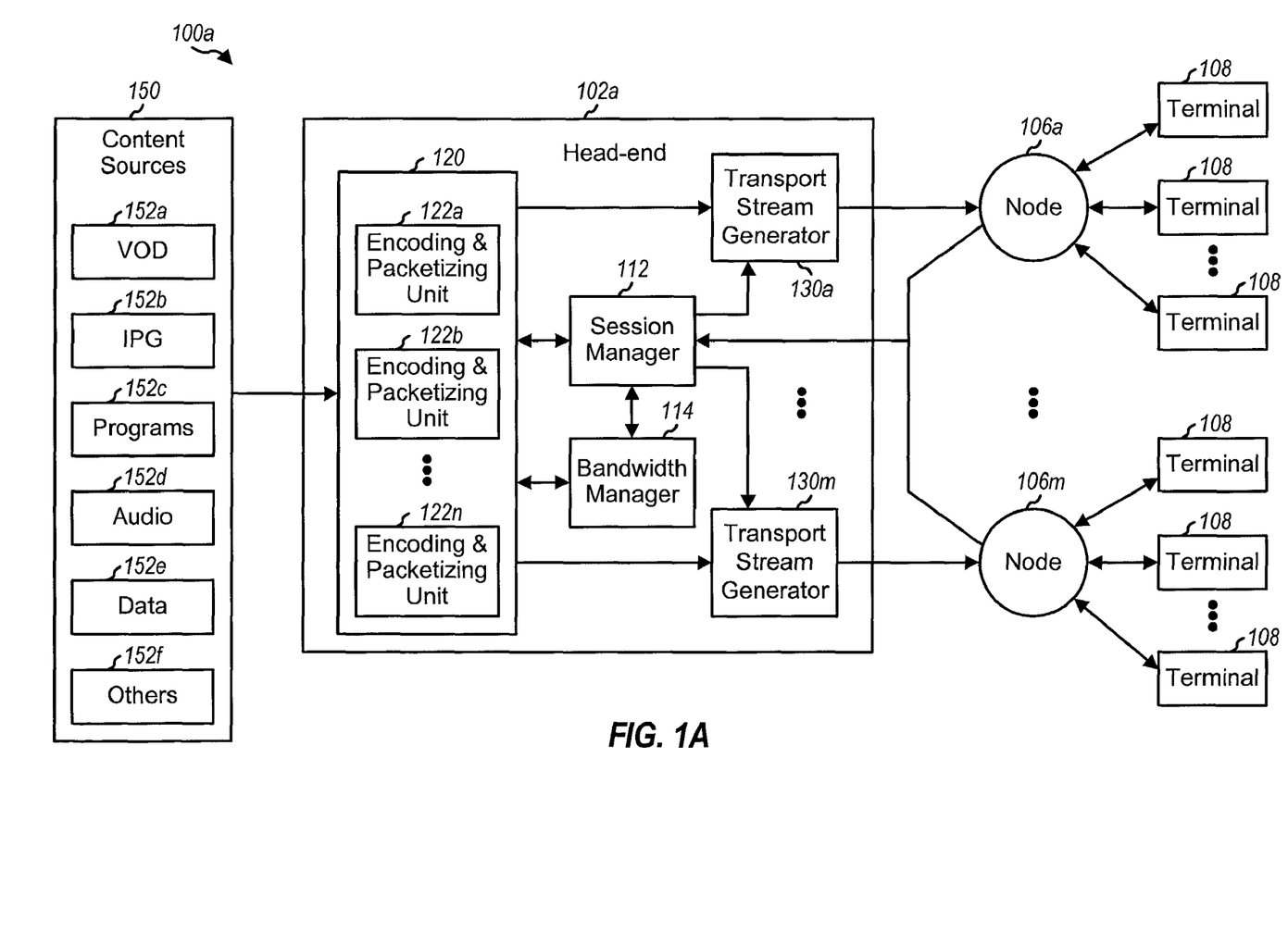
FIGS. 1A and 1B are block diagrams of two embodiments of an information distribution system that can be used to provide interactive program guide (IPG) and implement the multicasting of the invention.

FIG. 1A is a block diagram of an embodiment of an information distribution system 100a that can be used to provide interactive program guide (IPG) and implement the multicasting of the invention. Distribution system 100a includes a head-end 102a, a number of distribution nodes 106, and a number of set top terminals 108 coupled to each distribution node.

In the embodiment shown in FIG. 1A, head-end 102a includes a session manager 112, a bandwidth manager 114, a bank of encoding and packetizing units 120, and a number of transport stream generators 130 (e.g., one transport stream generator for each distribution node being served). Head-end 102a receives contents from content sources 150, which may include a Video-on-demand (VOD) source 152a, an interactive program guide source 152b, a programming v4652c, an audio source 152d, a data source 152e, and other sources 152d for other types of content (e.g., advertisements, and so on). The contents are provided to the bank of encoding and packetizing units 120. Each encoding and packetizing unit 122 receives the designated contents (e.g., the guide and video portions for one or more IPG pages to be transmitted) and generates a number of streams, with each stream being assigned a respective PID.

For example, to encode ten IPG pages such as that shown in FIG. 10C in Exhibit A, encoding and packetizing unit 122 may receive ten video inputs for the ten IPG pages, one audio input, and one or more data inputs. Encoding and packetizing unit 122 encodes and packetizes the guide portion of each video input, the video portion of one of the video inputs, the audio input, and the data input(s). Encoding and packetizing unit 122 can then output ten guide streams, one video stream, one audio stream, and one or more data streams. Each guide, video, audio, and data stream is assigned a respective PD. Each IPG page can be encoded using a slice-based or picture-based encoding scheme, depending on the particular implementation of the encoding and packetizing unit. Each transport stream generator 130 receives the outputs from one or more encoding and packetizing units 122 and multiplexes the received streams to form one or more transport streams to be provided to the distribution node. The multiplexing of the guide, video, audio, and data streams can be performed as described in Exhibit A. To form each transport stream, one packet of each of a number of video, audio, and data streams may be sequentially multiplexed into the transport stream. For example, a packet from each of guide streams 1 through 10 (e.g., for the ten IPG pages in FIG. 10C in Exhibit A), then a packet from a video stream, then a packet from an audio stream, then a packet from a data stream, and so on, can be multiplexed into the transport stream.

Transport stream generator 130 also provides packets conveying a program mapping table (PMT) for each final transport stream. The PMT specifies the PID values for program components. For example, a program may correspond to a particular broadcast channel, and the PMT may specify the PID values for the video, audio, and data streams relating to that broadcast channel. As noted above, each neighborhood served by a distribution node may have different program listings (e.g., different guide portions) but typically shares the same video(s). In addition, each neighborhood typically has different demand-cast requirements, which are dictated by the demands of the particular viewers in the neighborhood. During normal operation, the output stream from each transport stream generator 130, which includes one or more transport streams, will likely be different from the output streams from other transport stream generators for other distribution nodes.

Session manager 112 manages the operation of encoding and packetizing unit 122 and attempts to service the demands of terminals 108 in distribution nodes 106. For a particular demand-cast, session manager 112 receives a message from a terminal 108 requesting an IPG page (e.g., via a back-channel), determines whether the requested page is currently transmitted or available, and directs one of the encoding and packetizing units 122 to encode the requested IPG page and provide the resultant stream(s) to the transport stream generator serving the neighborhood where the requesting terminal resides. Depending on the particular scheme being implemented for the demand-cast (e.g., for a scheme that continually transmit the requested IPG page, as described in Exhibit B), session manager 112 may maintain track of the IPG page being demand-casted so that the page can later be tear down if not needed.

Bandwidth manager 114 assists session manager 112 in managing encoding and packetizing units 122. Bandwidth manager 114 monitors resources usage and availability for encoding and packetizing units 122 and reports this information to session manager 112, which uses the information to efficiently manage the encoding and packetizing units. For demand-cast, bandwidth manager 114 determines whether sufficient bandwidth and PIDs are available in the current transport stream(s) being transmitted to a particular distribution node. Bandwidth manager 114 is aware of the capacity of each transport stream generator 130, e.g., in terms of the number of streams and PIDs that the transport stream generator can support. If the number of (guide, video, audio, and data) streams to be provided to the transport stream generator or the number of PIDs to be used is greater than the capacity of the currently active transport stream(s), bandwidth manager 114 can signal session manager 112 and/or transport stream generator 130 accordingly. Transport stream generator 130 can then generate another transport stream for the additional (guide, video, audio, and data) streams. In an embodiment, bandwidth manager 114 keeps track of the available bandwidth for served streams via correspondences with session manager 112, and session manager 112 keeps track of the PIDs in use. In another embodiment, session manager 112 performs the functions of bandwidth manager 114 and keeps track of the available bandwidth as well as the PIDs in use.

The use of a bank of encoding and packetizing units 120 in head-end 102a can provide enhanced flexibility in generating the transport streams and may also reduce the amount of redundancy in the encoding process. In this embodiment, each IPG page to be transmitted from head-end 102a can be encoded once by any one of the available encoding and packetizing units 122. Each transport stream generator 130 receives the needed streams from selected ones of encoding and packetizing units 122 and generates the required final transport stream(s). In this manner, any distribution node can have access to any IPG page encoded by any encoding and packetizing unit 122.

Each encoding and packetizing unit 122 can be designed to encode the received contents based on a slice-based encoding scheme, as described in Exhibit A, which can provide improved utilization of the available bandwidth. Alternatively or additionally, encoding and packetizing unit 122 can be designed to implement picture-level encoding. Slice and picture-based encoding schemes are described in Exhibit A and in U.S. patent application Ser. No. 09/384,394, entitled "METHOD AND APPARATUS FOR COMPRESSING VIDEO SEQUENCES," filed Apr. 15, 1999, assigned to the assignee of the invention, and incorporated herein by reference.

In FIG. 1A, the transport stream generators are shown as being located within the head-end and operated to provide the output streams required by the neighborhood being served by the transport stream generators. In some distribution system 100, local neighborhood equipment can be provided to receive one or more transport streams from the head-end, extracts the information (e.g., guide and video slices) in the received transport streams, and combines the extracted information in an order such that the decoder at the terminals can easily decode the IPG without further re-organization. Thus, local neighborhood equipment may include a unit equivalent to the transport stream generator, which is used to generate one or more transport streams required by the neighborhood being served by the local neighborhood equipment.

Figure 1B:
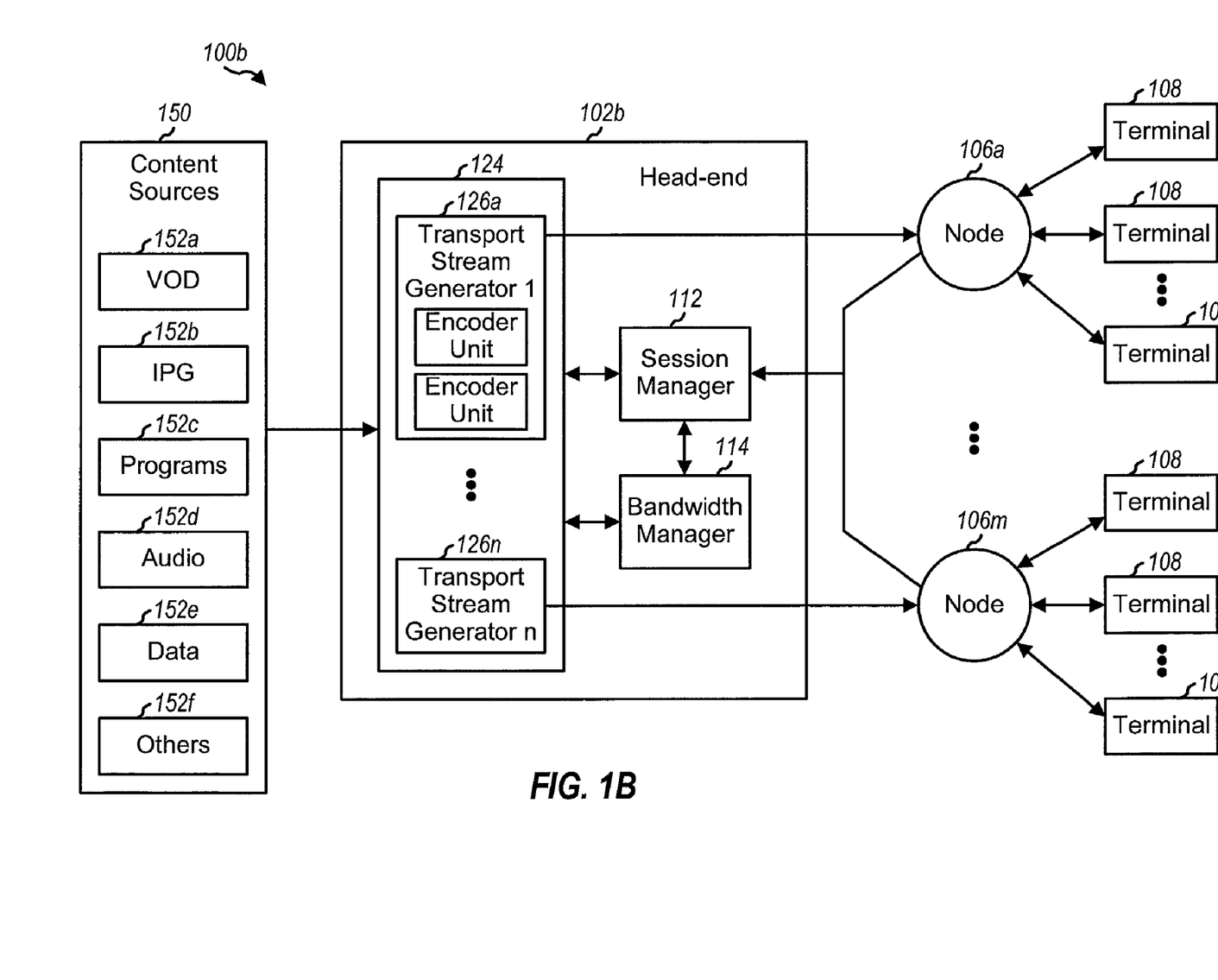

FIG. 1B is a block diagram of another embodiment of an information distribution system 100b that can also be used to provide interactive program guide and implement the multi-casting of the invention. Distribution system 100b includes a head-end 102b, a number of distribution nodes 106a through 106m, and a number of set top terminals 108 coupled to each distribution node.

In the embodiment shown in FIG. 1B, head-end 102b includes session manager 112, bandwidth manager 114, and a bank of transport stream generators 124. Head-end 102b receives contents from content sources 150, with the contents being provided to the bank of transport stream generators 124. Each transport stream generator 126 can be implemented with one or more encoding and packetizing units, such as the ones shown in FIG. 1A and described in Exhibit A. Each transport stream generator 126 receives the appropriate contents (e.g., the IPG pages to be provided on its output transport stream) and generates one or more transport streams. Each transport stream generator 126 also combines the one or more generated transport streams to generate a respective output stream. The output stream is then provided to a distribution node 106 being serviced by that transport stream generator 126.

Session manager 112 manages the operation of transport stream generators 126 and attempts to service the demands of terminals 108 in distribution nodes 106. Session manager 112 receives messages from terminals 108 requesting IPG pages, determines whether the requested pages are currently transmitted or available, and directs the proper transport stream generators 126 to provide the requested IPG pages on the transport streams to be transmitted to the neighborhood where the requesting terminals reside. Again, session manager 112 may maintain track of the IPG pages being demandcasted.

Bandwidth manager 112 can assist session manager 112 in managing transport stream generators 126. Bandwidth manager 114 may monitor resources usage and availability for the transport stream generators 126 and can report this information to session manager 112, which uses the information to efficiently manage the transport stream generators.

Various multiplexing structures and stream indexing schemes can be used to implement the multicast of the invention. The transport stream(s) to be provided to each distribution node can be organized to maximize the number of PID transitions within a transport stream, and to minimize the number of PID transitions between transport streams. Such transport stream organization would facilitate PID transitions and provide improved performance at the terminals because transitions within a transport stream are typically simpler and faster than transitions between transport streams. Some of these multiplexing structures and stream indexing schemes are described below and, for clarity, are described for a specific example in which 40 IPG pages are continually transmitted. These exemplary 40 IPG pages include guide listings for 200 channels in the current and near look-ahead time slots, and each set of ten IPG pages are encoded by their guide and video portions as shown in FIG. 10C in Exhibit A.

Figure 2A:
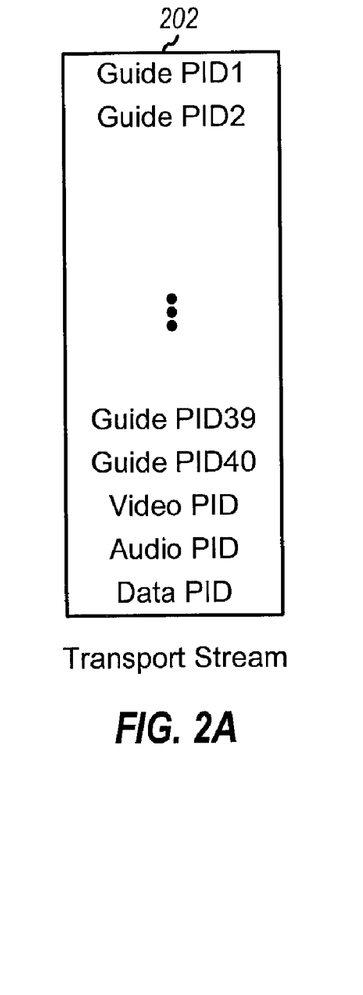
FIG. 2A is a diagram of a first multiplexing structure wherein the IPG pages are provided within a single transport stream.

FIG. 2A is a diagram of a first multiplexing structure wherein the IPG pages are provided within a single transport stream. For the 40 continually broadcast IPG pages, 40 guide portions can be coded and assigned guide PIDs 1 through 40 and one video portion can be coded and assigned a video PID. An audio input can also be coded and assigned an audio PID, and data can be coded and assigned one or more data PIDs. These guide, video, audio, and data PIDs can be transmitted on a single transport stream 202, as shown in FIG. 2A. With a single transport stream, the terminal is able to retrieve all IPG pages quickly without having to switch between transport streams.

Figure 2B:
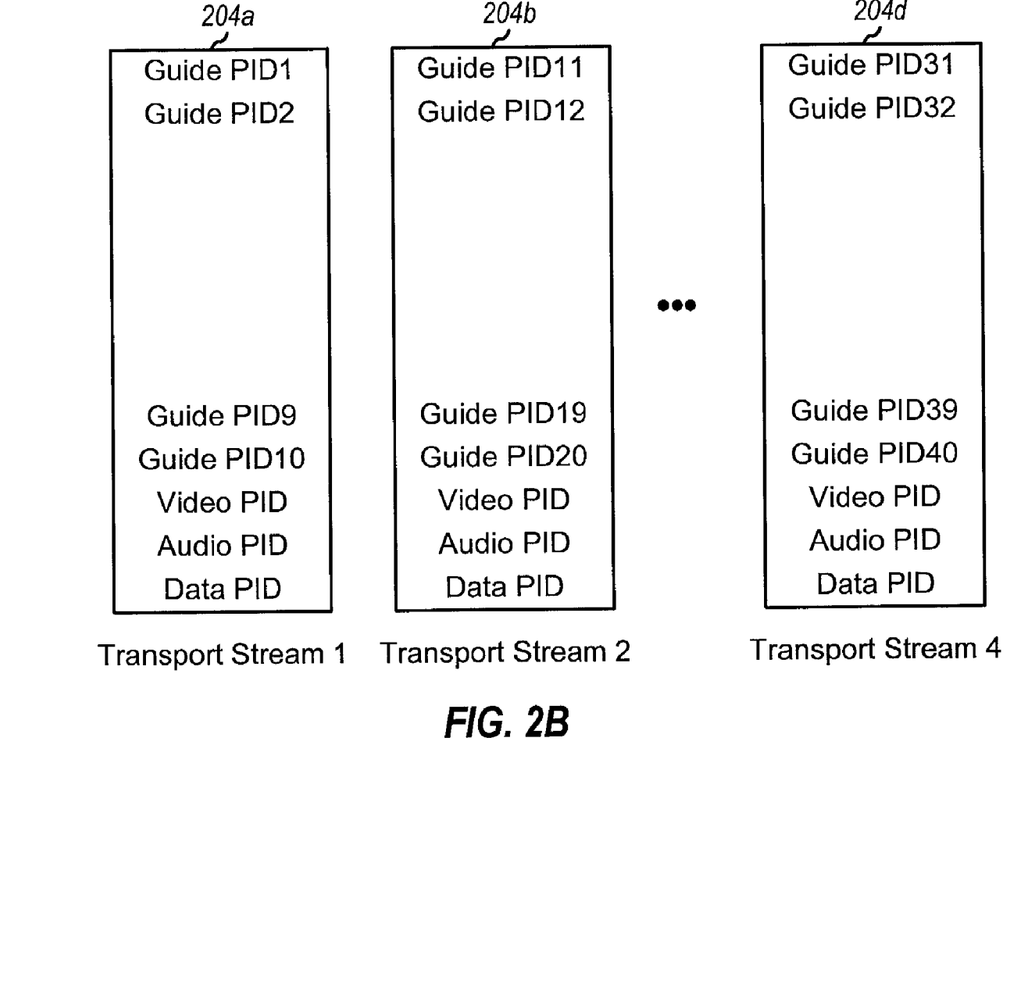
FIG. 2B is a diagram of a second multiplexing structure wherein the IPG pages are provided within multiple transport streams.

FIG. 2B is a diagram of a second multiplexing structure wherein the IPG pages are provided within multiple transport streams. As noted above, multiple transport streams may be used to provide additional transmission capacity and/or to accommodate more PIDs. In this specific example, the first transport stream 204a includes the first ten IPG pages, the second transport stream 204b includes the second ten IPG pages, the third transport stream 204c includes the next ten IPG pages, and the fourth transport stream 204d includes the last ten IPG pages. Different number of transport streams can also be used to send the IPG depending on various factors such as, for example, bandwidth usage, demands, and so on. Also, each transport stream can include different number of IPG pages than that shown in FIG. 2B.

As shown in FIG. 2B, the 40 IPG pages to be transmitted are multiplexed into four sets, one set of IPG pages for each transport stream. Each set can be defined to include guide listings for successive channels. For example, the first set can include guide listings for channels 1 through 100 for the current time slot, the second set can include guide listings for channels 101 through 200 for the current time slot, the third set can include guide listings for channels 1 through 100 for the next near look-ahead time slot, and the last set can include guide listings for channels 101 through 200 for the next near look-ahead time slot. This multiplexing structure may reduce the number of transitions between transport streams when scrolling through the guide listings.

As described above, when a viewer selects a new IPG page for viewing, a determination is first made at the terminal whether the selected IPG page is transmitted in the current transport stream(s). If the answer is yes, the guide PID for the selected page is extracted from the transport stream, decoded, and presented. Otherwise, if the selected IPG page is transmitted on another transport stream, the terminal first recovers that transport stream and then processes the selected guide P. Additional processing time is typically required to switch between transport streams, which may result in noticeable delays at the terminal.

Figure 2C:
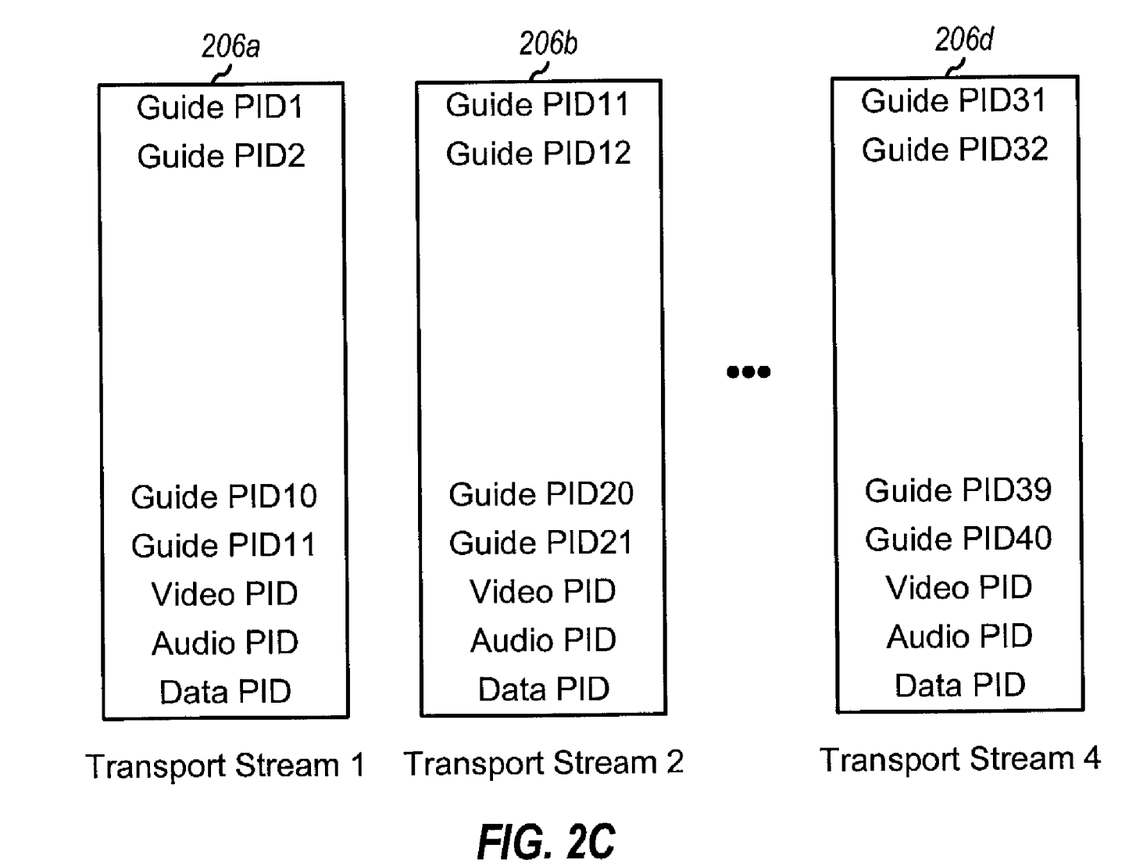
FIG. 2C is a diagram of a third multiplexing structure wherein the IPG pages are provided within multiple transport streams with overlapping guide PIDs.

FIG. 2C is a diagram of a third multiplexing structure wherein the IPG pages are provided within multiple transport streams with overlapping guide PIDs. To reduce processing delays associated with switching between transport streams at the terminal (e.g., when a viewer is scrolling through program listings), some of the IPG pages can be transmitted on multiple transport streams. In the overlapping multiplexing structure, the IPG pages to be transmitted are also partitioned into four sets of IPG pages, one set for each transport stream. However, each set includes one or more IPG pages from a neighboring set. In the example shown in FIG. 2C, the first transport stream includes IPG pages 1 through 11, the second transport stream includes IPG pages 11 through 21, the third transport stream includes IPG pages 21 through 31, and the fourth transport stream includes IPG pages 31 through 40.

With the overlapping multiplexing structure, when a viewer tunes to an "end" IPG page, the terminal can initiate the processing of the adjacent transport stream so that this transport stream is available if the viewer selects an IPG page from this transport stream. For example, when the viewer tunes to IPG page 11 in the first transport stream, the terminal can initiate the processing of the second transport stream so that this transport stream is available if the viewer selects IPG page 12. The amount of overlapping between transport streams (e.g., one page in FIG. 2C) can be dependent on various factors such as, for example, the time required to acquire a new transport stream, the available bandwidth in the transport streams, and so on.

To also reduce processing delays, a frequently accessed IPG page can be transmitted in multiple transport streams. For example, one or more IPG pages in the current time period can be transmitted in each transport stream being provided to a neighborhood. As another example, a popular IPG page (e.g., for a big sporting event) can be transmitted in a number of transport streams. Inclusion of the frequently accessed IPG page in multiple transport streams allows a terminal processing any one of these transport streams to be able to retrieve the IPG page more quickly without having to switch to another transport stream.

Referring back to FIG. 1A, each IPG page can be coded by one of the available encoding and packetizing units 122. The resultant guide stream from the encoding and packetizing unit 122 can then be sent to one or more transport stream generators 130. Each transport stream generator 130 can be directed (e.g., by session manager 112) to include the guide stream in one or more transport streams. In this manner, various multiplexing structures can be implemented without additional burden on the encoding units.

The particular multiplexing structure for a transport stream generator can also be selected based on various factors associated with that transport stream generator. For example, the multiplexing structure may be selected based on the available bandwidth, the demands, and other factors. The multiplexing structure can also be adjusted dynamically. For example, more overlapping may be utilized if more bandwidth is available or as more transport streams are added. Also, each transport stream generator within the head-end may be operated to implement a particular multiplexing structure especially suited for the neighborhood being served by that transport stream generator.

For clarity, the multicasting, multiplexing structure, and stream indexing schemes of the invention have been specifically described for the delivery of IPG. However, these techniques can also be adapted for delivery of other services and contents. In general, any content (including IPG) can be coded, assigned respective PIDs, multiplexed into one or more transport streams, and transmitted from the head-end to a neighborhood. For example, the techniques of the invention can be used to deliver stock quotes, sports scores, headline news, traffic reports, other guides, and so on. During periods of heavy demands (e.g., during prime time), more transport streams can be transmitted to meet increased demands. The transport streams can subsequently be tear down when not needed.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A system for providing interactive program guide (IPG), the system comprising:

a plurality of encoding units, disposed within a headend of a distribution system, each of the plurality of encoding units being operative to receive content from a plurality of content sources, the content including a plurality of video inputs, a corresponding IPG page associated with each of the plurality of video inputs, an audio input and at least one data input, wherein each of the plurality of video inputs associated with IPG pages include a guide portion and a video portion, the plurality of encoding units encoding the guide portion and the video portion of each video input associated with the IPG pages, the audio input and the at least one data input and generating a guide stream for each of the video inputs and a video stream, an audio stream and at least one data stream, wherein each generated guide stream, video stream, audio stream and data stream is assigned a respective packet identifier (PID);

at least one transport stream generator operatively coupled to the plurality of encoding units, each transport stream generator being assigned to a single distribution node of the distribution system, each transport stream generator further operative to receive the generated guide stream, video stream, audio stream and data stream from one or more of the plurality of encoding units and to multiplex packets from the received streams into one or more transport streams, wherein the at least one transport stream generator generates packets conveying a program mapping table (PMT) for each transport stream;

a session manager coupled to the at least one transport stream generator and the plurality of encoding units, the session manager being operative to manage the operation of the plurality of encoding units and the at least one transport stream generator and to service demands of each distribution node of the distribution system; and a bandwidth manager, coupled to the at least one transport stream generator for monitoring resources usage and availability for encoding by the plurality of encoding units, the bandwidth manager, in response to a demand received from a node of the distribution system, obtains information regarding whether sufficient bandwidth and PIDs are available in the one or more transport streams being transmitted to the distribution node to service the demand and communicates the obtained information to the session manager for servicing the demand, wherein the session manager controls the at least one transport stream generator to dynamically adjust the number of transport streams generated based on the obtained information received from the bandwidth manager.

2. The system of claim 1, wherein the plurality of encoding units are operative to encode only once each IPG page to be transmitted from the at least one transport stream generator.

3. The system of claim 1, wherein the session manager directs a particular transport stream generator to generate an additional transport stream as usage increases and exceeds the capacity of currently transmitted transport stream(s).

4. The system of claim 1, wherein the session manager directs a particular transport stream generator to generate an additional transport stream if the number of streams to be transmitted by the particular transport stream generator exceeds the capacity of currently transmitted transport stream (s).

5. The system of claim 1, wherein the session manager, in response to the information communicated by the bandwidth manager, directs a particular transport stream generator to generate an additional transport stream when the information indicates a required number of PIDs exceeds a maximum number of PIDs supported by currently transmitted transport stream(s).

6. The system of claim 1, wherein the session manager directs a particular transport stream generator to tear down a transport stream if usage falls below the capacity of remaining transport streams.

7. The system of claim 1, wherein each transport stream generator is operative to serve a respective group of terminals within a particular neighborhood.

8. The system of claim 1, wherein each transport stream generator is operable to provide differentiated IPG via the one or more transport streams generated by the transport stream generator.

9. The system of claim 1, wherein a plurality of transport streams are generated by a particular transport stream generator, and wherein each of the plurality of transport streams includes a respective set of IPG pages represented by the generated streams.

10. The system of claim 9, wherein the plurality of transport streams from the particular transport stream generator include transport streams with overlapping guide PIDs.

11. The system of claim 9, wherein each of the plurality of transport streams from the particular transport stream generator includes one or more common IPG pages.

12. The system of claim 9, wherein the sets of IPG pages for the plurality of transport streams from the particular transport stream generator are organized to reduce likelihood of switching between transport streams at a receiving device.

13. The system of claim 9, wherein the sets of IPG pages for the plurality of transport streams from the particular transport stream generator are organized to increase likelihood of PID transitions within the same transport stream.

14. The system of claim 1, wherein each encoding unit is operative to implement a slice-based encoding scheme.

15. The system of claim 1, wherein each encoding unit is operative to implement a picture-based encoding scheme.

16. A system for providing interactive program guide (IPG), the system comprising:

at least one transport stream generator, disposed within a headend of a distribution system, wherein each transport steam generator is assigned to a single distribution node of the distribution system, each transport stream generator further including at least one encoder unit operative to receive content from a plurality of content sources, the content including a plurality of video inputs, a corresponding IPG page associated with each of the plurality of video inputs, an audio input and at least one data input, wherein each of the plurality of video inputs associated with IPG pages include a guide portion and a video portion, the plurality of encoding units encoding the guide portion and the video portion of each video input associated with the IPG pages, the audio input and the at least one data input and generating a guide stream for each of the video inputs and a video stream, an audio stream and at least one data stream, wherein each generated guide stream, video stream, audio stream and data stream is assigned a respective packet identifier (PID), each transport stream generator operative to receive the generated guide stream, video stream, audio stream and data stream from one or more of the plurality of encoding units and to multiplex packets from the received streams into one or more transport streams, wherein the at least one transport stream generator generates packets conveying a program mapping table (PMT) for each transport stream;

a session manager coupled to the at least one transport stream generator and operative to manage the operation of the plurality of encoding units and the at least one transport stream generator and to service demands of each distribution node of the distribution system; and a bandwidth manager, coupled to the at least one transport stream generator for monitoring resources usage and availability for encoding by the plurality of encoding units, the bandwidth manager, in response to a demand received from a node of the distribution system, obtains information regarding whether sufficient bandwidth and PIDs are available in the one or more transport streams being transmitted to the distribution node to service the demand and communicates the obtained information to the session manager for servicing the demand, wherein the session manager controls the at least one transport stream generator to dynamically adjust the number of transport streams generated based on the obtained information received from the bandwidth manager.

17. A method for providing interactive program guide (IPG) from a transmission source to a plurality of terminals, the method comprising:

receiving, at a plurality of encoding units disposed within a headend of a distribution system, content from a plurality of content sources, the content including a plurality of video inputs, a corresponding IPG page associated with each of the plurality of video inputs, an audio input and at least one data input, wherein each of the plurality of video inputs associated with IPG pages include a guide portion and a video portion, encoding, at the plurality of encoding units, the guide portion and the video portion of each video input associated with the IPG pages, the audio input and the at least one data input;

generating, at the plurality of encoding units, a guide stream for each of the video inputs and a video stream, an audio stream and at least one data stream, wherein each generated guide stream, video stream, audio stream and data stream is assigned a respective packet identifier (PID);

receiving the generated guide stream, video stream, audio stream and data stream, by at least one transport stream generator operatively coupled to one or more of the plurality of encoding units, each transport stream generator being assigned to a single distribution node of the distribution system;

multiplexing packets from the received streams into one or more transport streams, wherein the at least one transport stream generator generates packets conveying a program mapping table (PMT) for each transport stream;

monitoring, at a session manager, the operation of the plurality of encoding units encoding the plurality of IPG pages, audio input and data input and the at least one transport stream generator;

monitoring, at the session manager, demands received from the plurality of terminals via a node of the distribution system;

in response to a demand received by the session manager from a terminal via a node of the distribution system, obtaining, by a bandwidth manager, information regarding whether sufficient bandwidth and PIDs are available in the one or more transport streams being transmitted to the plurality of terminals to service the demands;

comparing the demand from the terminal against the obtained information; and dynamically adjusting, by the session manager, the number of transport streams to be transmitted by the transport steam generator to the plurality of terminals based on a result of the comparing the demand from the terminal against the obtained information received from the bandwidth manager.

18. The method of claim 17, further comprising:
providing an additional transport stream for the plurality of terminals if the demands exceeds the current capacity.

19. The method of claim 17, further comprising:
providing an additional transport stream for the plurality of terminals if a required number of packet identifiers (PIDs) exceeds a maximum number of PIDs supported by the one or more transport streams currently being transmitted.

20. The method of claim 17, further comprising:
tearing down a particular currently transmitted transport stream if the demands fall below the capacity of remaining transport streams.

* * * * *

UNITED STATES PATENT AND TRADEMARK OFFICE
CERTIFICATE OF CORRECTION

| | | |
|---|---|---|
| PATENT NO. | : 7,992,172 B1 | Page 1 of 1 |
| APPLICATION NO. | : 09/679210 | |
| DATED | : August 2, 2011 | |
| INVENTOR(S) | : Gordon et al. | |

It is certified that error appears in the above-identified patent and that said Letters Patent is hereby corrected as shown below:

Col. 1, line 28: "(now abandonded)," should read --(now abandoned),--

Col. 1, line 31: delete "now abandoned" following "Mar. 30, 2000"

Col. 1, lines 35-36: delete "now U.S. Pat. No. 7,127,737" after "Mar. 14, 2000"

Col. 4, line 63: "Each transport" should start a new paragraph

Col. 8, line 11: "the selected guide P." should read --the selected guide PID.--

Signed and Sealed this
Twenty-seventh Day of March, 2012

David J. Kappos
*Director of the United States Patent and Trademark Office*